(12) United States Patent
Mereu et al.

(10) Patent No.: US 10,861,501 B2
(45) Date of Patent: *Dec. 8, 2020

(54) SYNCHRONIZED ASSET TRAYS

(71) Applicant: COREL CORPORATION, Ottawa (CA)

(72) Inventors: Stephen Wesley Mereu, Carp (CA); Paul Legomski, Ottawa (CA)

(73) Assignee: Corel Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,477

(22) Filed: Feb. 12, 2019

(65) Prior Publication Data

US 2019/0172500 A1 Jun. 6, 2019

Related U.S. Application Data

(63) Continuation of application No. 13/794,054, filed on Mar. 11, 2013, now Pat. No. 10,235,381.

(51) Int. Cl.
*G11B 27/34* (2006.01)
*G11B 27/034* (2006.01)
*G06F 16/178* (2019.01)

(52) U.S. Cl.
CPC ............ *G11B 27/34* (2013.01); *G06F 16/178* (2019.01); *G11B 27/034* (2013.01)

(58) Field of Classification Search
CPC ...... G06F 17/30; G06F 3/0481; G06F 3/0482; G06F 3/0483; G06F 3/0484; G06F 3/0485; G06F 16/148; G11B 27/34
See application file for complete search history.

(56) References Cited

U.S. PATENT DOCUMENTS

2009/0193107 A1\* 7/2009 Srinivasan ........ G06F 17/30132
709/223
2013/0144883 A1\* 6/2013 Shin .................. G06F 17/30598
707/738

\* cited by examiner

*Primary Examiner* — Rashawn N Tillery
(74) *Attorney, Agent, or Firm* — Rosenberg, Klein & Lee

(57) ABSTRACT

A method including the steps of: providing a computer readable non-transitory storage medium including a computer readable code configured to run on a local computer and to perform a process to organize a plurality of assets in a tray system including a core tray program including one or more trays, and a synchronization manager configured to synchronize assets represented by icons in the one or more trays with corresponding assets at one or more file storage locations; running on a local computer the computer readable code; displaying by computer the tray; and synchronizing by computer the assets represented by icons in the one or more trays with the corresponding assets at one or more file storage locations. A system to perform the method is also described.

20 Claims, 4 Drawing Sheets

SYNCHRONIZED ASSET TRAYS

CROSS-REFERENCE TO RELATED APPLICATIONS

This patent application claims the benefit as a continuation of U.S. patent application Ser. No. 13/794,054 filed Mar. 11, 2013 entitled "Synchronized Asset Trays", the entire contents of which are included by reference.

FIELD OF THE INVENTION

The invention relates to a system and method to organize assets and more particularly to a system and method to organize and synchronize assets across one or more local or remote asset storage sites.

BACKGROUND OF THE INVENTION

Digital images are everywhere. Most people have sets of digital images from every part of their life from trips and work, to family and art. Most of these images are stored on one or more hard drives. Some images are shared via social media. Images are also stored, copied, or backed up to the cloud. Other images are generated by computer programs or edited by imaging editing software. Images related to image creating or image editing software are often stored in separate file folders related to a particular graphics computer program.

The problem is that as the number of digital images being created by users increases dramatically, our ability to manage, organize, and find digital images has not significantly improved.

SUMMARY OF THE INVENTION

There is a need for a more efficient system and method to unify a user's digital images.

According to one aspect, the invention features a method including the steps of: providing a computer readable non-transitory storage medium including a computer readable code configured to run on a local computer and to perform a process to organize a plurality of assets in a tray system including a core tray program including one or more trays, and a synchronization manager configured to synchronize assets represented by icons in the one or more trays with corresponding assets at one or more file storage locations; running on a local computer the computer readable code; displaying by computer the tray; and synchronizing by computer the assets represented by icons in the one or more trays with the corresponding assets at one or more file storage locations.

In one embodiment, the step of providing a computer readable non-transitory storage medium including a computer readable code further includes providing the core tray program including an abstraction layer with at least one interface to a physical storage location configured to store one or more assets in a cloud.

In another embodiment, the step of providing a computer readable non-transitory storage medium including a computer readable code further includes providing the core tray program including an abstraction layer with at least one interface to a physical storage location configured to store one or more assets at a social media site.

In yet another embodiment, the step of displaying by computer the tray includes displaying by computer the tray as part of a graphical user interface (GUI) of a graphics or photo editing computer program.

In yet another embodiment, at least one of the icons includes a low resolution bit mapped impression of an image.

In yet another embodiment, the icons in at least one of the one or more trays represent images of a project.

In yet another embodiment, the icons in at least one of the one or more trays represent images having a common theme.

In yet another embodiment, at least one asset of the plurality of assets includes an image file or a vector file.

In yet another embodiment, at least one asset of the plurality of assets includes a document file.

In yet another embodiment, at least one asset of the plurality of assets includes an asset selected from the group consisting of a font, a color, and a pattern.

In yet another embodiment, at least one asset of the plurality of assets includes an application setting or an application configuration.

In yet another embodiment, at least one asset of the plurality of assets includes a reference to a logical asset.

In yet another embodiment, the logical asset resides at a remote location accessible via the Internet or an intranet.

In yet another embodiment, at least one asset of the plurality of assets includes data which describes an asset.

In yet another embodiment, the icons represent assets in a tray.

According to another aspect, the invention features a system which includes a local computer configured to run a computer readable non-transitory storage medium including a computer readable code configured to run on the computer and to perform a process to organize a plurality of assets in a tray system including a core tray program including one or more trays, and a synchronization manager configured to synchronize assets represented by icons in the one or more trays with corresponding assets at one or more file storage locations. The core program is configured to run on a local computer. The computer readable code is configured to display by computer the tray, and to synchronize by computer the assets in the one or more trays with the corresponding assets at one or more file storage locations.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
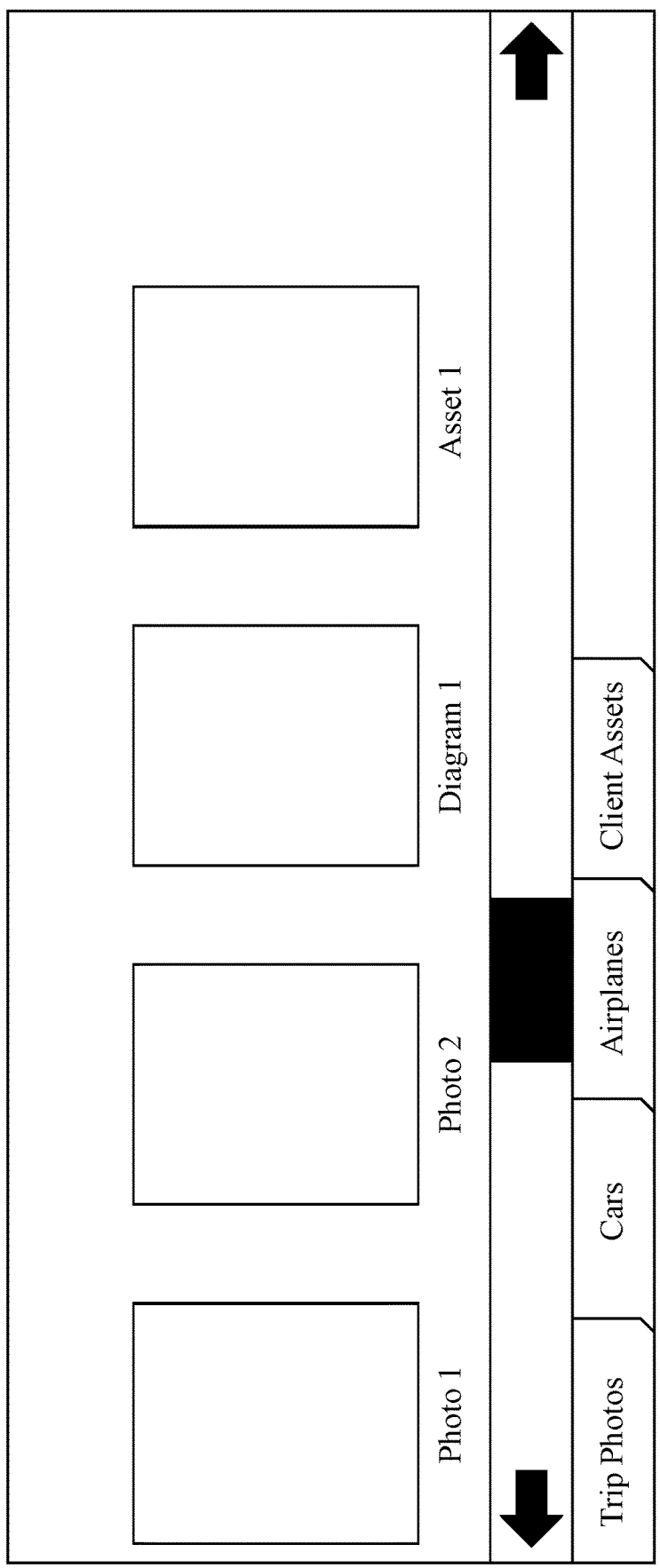
FIG. 1 shows an illustration of an exemplary tray of icons.

Definitions: "asset"—An asset can be a file (e.g. image file, vector file, document, font etc.), a reference to an asset found elsewhere (e.g. on the Internet/intranet), or data describing the asset (e.g. details describing QR code, color palette, etc.). An asset can also include a font, a color, a pattern, etc. An asset can also include an application setting or an application configuration.

It is common for a user to have thousands of digital images. It is equally common for many of those images to be nearly lost, unorganized, or forgotten. Some digital images originate from a digital camera and are often downloaded to a user's computer. Other images are set aside for editing in an image editing computer program, such as PaintShop Pro™, available from the Corel Corporation of Ottawa, Canada. Yet other images might be drawn from scratch in a computer graphics program such as CorelDRAW, also available from the Corel Corporation. Still other digital images might originate from a camera equipped smart phone or a copy of an image from a website. Also, particularly among users who might have larger collections of digital images, it is very likely that some of their images are being shared at social media sites such as Facebook™ or Twitter™.

One problem is that even the most serious collectors of digital images have little understanding of where all of their images can be found. They might, at best, have a vague idea of where to start searching for a particular image or set of images.

In a partial solution for the typical disorganized user of images, the Corel Corporation added a tray system to their suite of graphics programs. A tray holds and organizes icons that represent assets, such as for example, stored images. The icons can be a relatively low resolution bit mapped impression of an image stored in the image file they are meant to represent. The tray system has expanded to multiple trays, where users can organize related images in each tray. Organization can be done by a graphics project in progress, or, for example, by some topical system, such as, for example, images from a March trip to a particular country or series of countries. The tray system begins to solve the problem of how to organize assets, including image assets. However, most persons with large collections of digital images still store them over a wide range of locations from the local hard drive, to hard drive storage in the cloud, such as for example, using cloud services, such as, for example, Google™ cloud service, DropBox™ cloud service, Box™ cloud service, SkyDrive™ cloud service, etc. Also, many users are prolific creators of digital images which they post directly to social media sites such as Facebook™ and Twitter™.

As described hereinabove, low resolution images in the tray represent assets. In some embodiments, if the user resizes the tray to be larger (and if the asset is of a type that can be displayed by a larger image), then the lower resolution image can be automatically swapped out by computer with a higher resolution version of the same image or a similar image.

It was realized that a global approach to asset management is needed. In one part of the solution, the tray system can send and receive (assets) to and from storage at the cloud services. However, there is still a problem with the diversity of storage locations and how the various collections of images over a yet wider storage space can be tracked and maintained. It was found that a solution to managing a large number of assets across a wide range of storage media and social media is a unified synchronization scheme. The solution further includes an abstraction layer which allows the assets on some local or remote storage media of one or more trays to interact seamlessly with assets as represented by icons in trays, regardless of where the asset is physically stored (e.g. file storage locations). Therefore, once a user adds an asset to a tray, the physical location of the asset thence forth is unimportant to the user. The user can search, find, and interact with the icon to retrieve the actual asset, copy or move the actual asset, and/or to post or download the asset from or to any suitable social media site directly from a tray.

Typically, but not necessarily, users add assets to trays that have some organizational relevance, e.g. assets of a project or assets having a common theme. For example, there can be a tray for a particular vacation, business trip, family event, etc. FIG. 1 shows an illustration of one exemplary tray of assets called "Trip Photos" representing the exemplary assets Photo1, Photo2, Diagram1, and Asset1. Other exemplary trays in FIG. 1 are "Cars", "Airplanes" and "Client Assets" which each have their own set of assets that would be displayed once the user selected that tray to view.

A computer application runs on a local computer and provides the tray structure, abstraction layer (a client abstraction) which includes interfaces to both cloud drives and social media sites. At least one interface can be provided to connect and share files with any suitable storage location, such as for example, physical storage in the cloud. Typically, "the cloud" includes the Internet, however a cloud can include any remote storage accessible by a communicative connection, such as typically is accomplished by a network connection. As an abstraction layer, it is unimportant where an asset is physically located (i.e. a physical storage location). It is similarly unimportant to the tray process whether the location is purely physical storage for dedicated storage purposes or a file storage system at a social media site. Further, the application includes a synchronization manager so that the tray can be maintained in synchronization with its corresponding files, regardless of where the files are physically located.

Further, for users of graphic software such as graphics vector editing and photo editing (typically bit map based editing) software, the trays can be integrated into one or more graphics programs or a set of one or more graphics programs. As one exemplary embodiment of the process as described herein, graphics programs of the Corel graphics suite of programs can all directly access trays to view assets in the trays, add assets to the trays, use assets from the trays in the program, or perform operations on the assets in the trays. While there is also a dedicated Corel CONNECT™ application that is dedicated to managing assets in one or more trays of assets, the tray system is common to all graphics programs which use the trays. Therefore the trays between applications are "synchronized" by definition. The same trays can be displayed and accessed from any of the so configured graphics programs or from the tray management program (e.g. CONNECT™).

Figure 2:
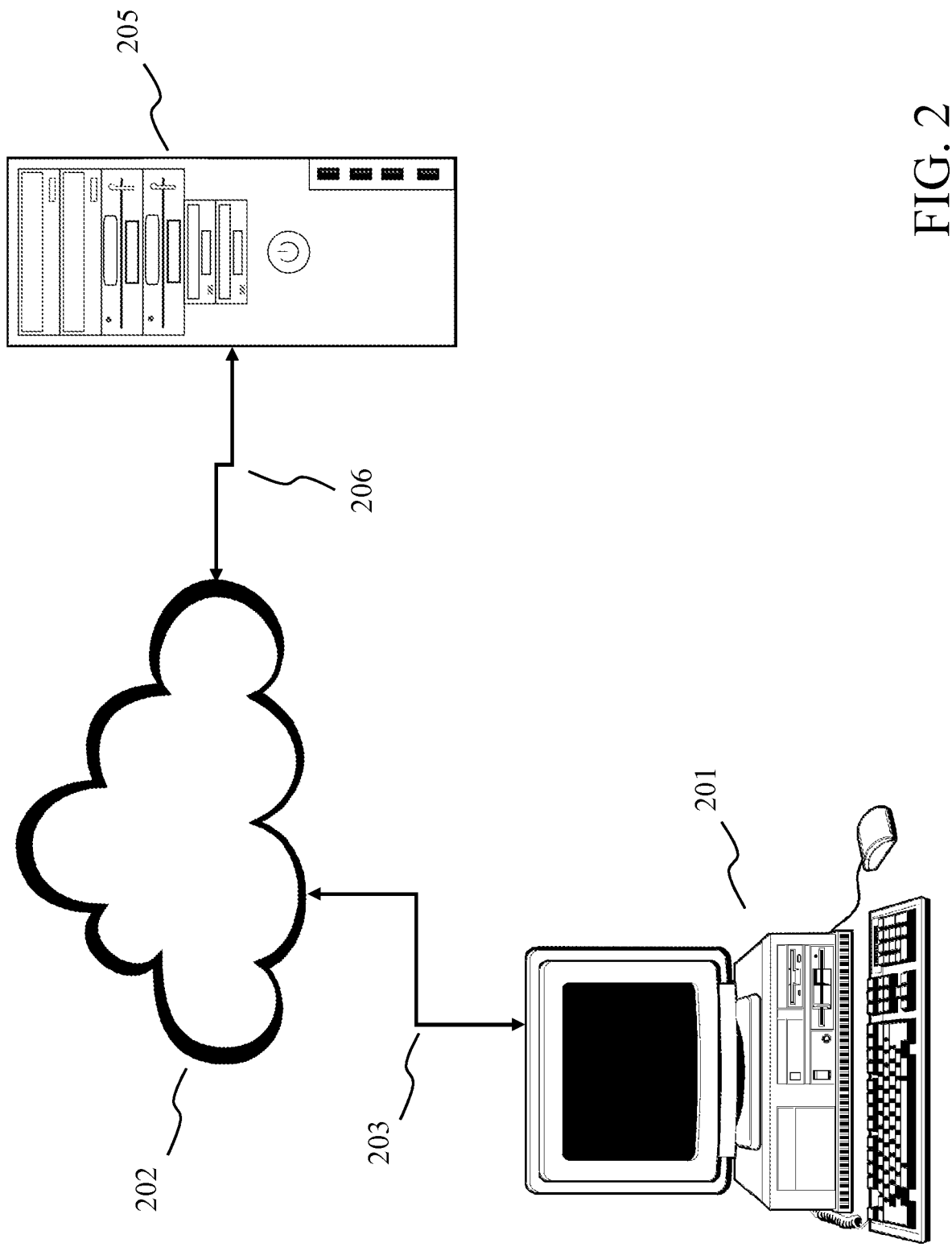
FIG. 2 shows a block diagram of one exemplary computer system suitable for performing the processes described herein.

FIG. 2 shows a block diagram of one exemplary computer system suitable for performing the processes described herein. A computer, typically a local computer 201 (e.g. a client computer) is connected via any suitable data connection 203 (e.g. Cable modem, WiFi, WiMAX™, FioS™, DSL, local or wide area Ethernet network connections, etc.) typically via an Internet connection, to any suitable cloud 202 (typically the Internet). A computer server configured as a server 205 is also connected to the cloud 202 via any suitable connection 206. Server 205 can include, for example a cloud storage unit or a social media site. The computers, local computer 201, and server 205, need not be of the same type computer.

Figure 3:
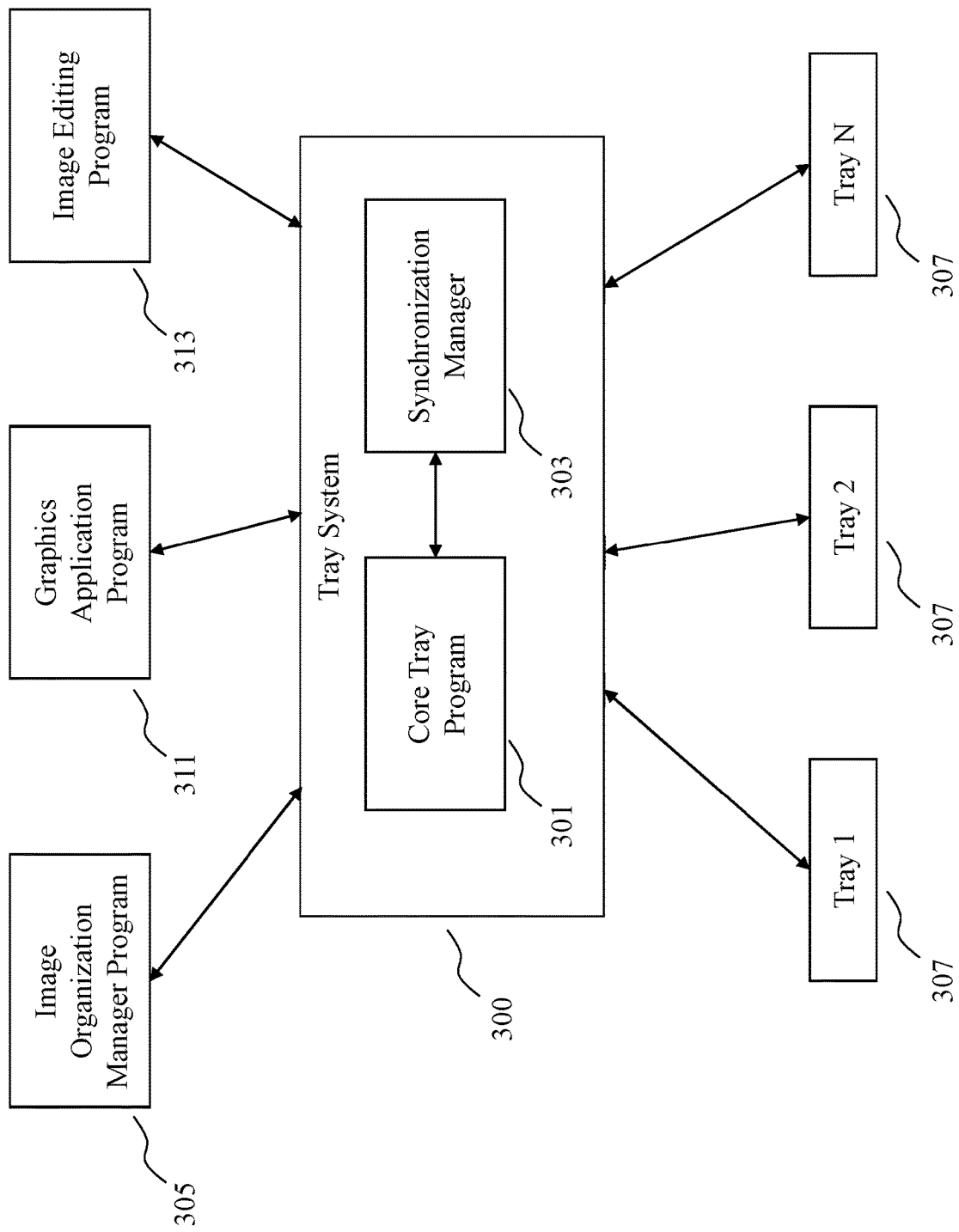
FIG. 3 shows a block diagram of the software architecture.

FIG. 3 shows a block diagram of the software architecture. The tray system 300 includes a core tray program 301 and a synchronization manager 303. A dedicated tray management program 305 with a graphical user interface (GUI) (not shown in FIG. 3) can be used for tray management. Since the trays 307 are common to other applications, such as other graphics application programs 311 or image editing programs 313, those programs access the same core tray system 300. The core tray program 301 can be run by any of the other graphic application programs, even if the dedicated tray management program 305 is not running. Thus features, such as tray synchronization 303 can be run by the tray core code 301, even when the dedicated tray management program 305 is not running.

Now turning to the tray core program and the synchronization manager in more detail, the core tray manager allows the user the ability to load a tray, save a tray, delete a tray, rename a tray, add assets to a tray, remove assets from a tray and allow asset operations depending on the type of asset. A tray can hold a a plurality of assets. The assets in a tray are typically represented in the user interface as icons representing the assets. An asset can be a file (e.g. image file, vector file, document, etc), reference to a logical asset found elsewhere (e.g. on the Internet/intranet), or data describing the asset (e.g. details describing QR code, color palette, etc.) When an application that uses the core tray manager runs it will display the trays in a GUI in the application window. The user can then interact with it in the GUI. Since the trays can be stored in a shared location, modifying the trays through one application GUI will be reflected in the other. This allows the user to seamlessly work between the different applications to organize and use their trays and assets.

Now turning to the synchronization manager in more detail. In today's interconnected world, users may be working on a project at their work computer and drag a number of assets into a tray. When they go home it is convenient if they can continue to work on their project from their home computer. This is one goal of tray synchronization. The user defines which cloud service or social media site they would like to use as the sync depository. For example, they may choose to use their SkyDrive™ account as the place where their trays will be synced. As they use one of the applications that makes use of the core tray manager it will make use of the sync manager to keep the local trays in sync with the version in the cloud. The user has the ability to set the sync frequency from a range of very frequent to less frequent. At the sync frequency interval the sync manager will perform the syncing of trays. Synchronization status and sync time for each tray and its assets are maintained to mark the time when the last successful sync occurred on the machine. Each machine that is participating in syncing of trays will maintain their own synchronization status for each tray and file. When a sync occurs, the sync manager compares each local tray and its assets as well as cloud trays and assets of cloud trays to see if any have changed since the last sync time. If the local version changed, then it is copied to the cloud. If the cloud version changed then it is copied to the local file system. If both changed then a conflict resolution procedure occurs. There are several ways to resolve conflicts (e.g. keeping both versions but renaming one, presenting the user with a conflict resolution dialog and allowing them to select, etc.) Once a sync has completed, the synchronization status for each tray and its assets will be up to date. This procedure will occur on each machine that is participating in tray synchronization. The outcome is the user has the latest versions of their trays and the assets of the trays on all the machines that are participating.

Now turning to the tray management program and tray management GUI in more detail, the tray management allows the user to visually interact with the trays. The user can use the GUI to create a tray, delete a tray, rename a tray, add assets to a tray, delete assets from a tray and perform operations on assets of trays depending on the type of asset. Using the asset organization program the user can search for assets from various sources. If they find assets they wish to keep, they can drag these assets to the tray. If the asset is a file, it will be stored in the tray so that it can be synced individually during tray syncing. If it is a reference to a logical asset of a tray found on the Internet/intranet or is data describing the asset of a tray then this information is stored with the tray data itself and will be synced when the tray is synced. The tray maintains information about the assets in the tray including, but not limited to, the asset's source provider id, asset's id that it is known by on the source provider, asset type, visual title, description, low res image URL, high res image URL, embedded thumbnail. Some of these asset properties may not be applicable depending on the asset type. Asset types can be any kind of digital asset for example, an image, vector, font, template, etc. The tray management GUI will display the thumbnail of the asset in the tray. If the user enlarges the tray visual area, a larger image may be displayed if available.

Now turning to how another graphics program can access the same tray structure each application that uses the core tray management code will share in the ability to work with trays and assets in the trays. They will also have the GUI to display the tray to allow the user to interact with it. Since it is using the same core tray management, the trays presented from each application on the same machine will be "in sync". If the user elects to enable tray synchronization with one or more cloud services or social media sites then all the applications using the core tray management code and in turn the synchronization manager will display trays that are "in sync" with each other.

The abstraction layer 300 provides a common interface that each of the applications can use. This common interface allows the GUI to be displayed as well as operations from the GUI to the individual application. An operation, for example, can include bringing a selected asset from a tray into an application for editing or use.

Figure 4:
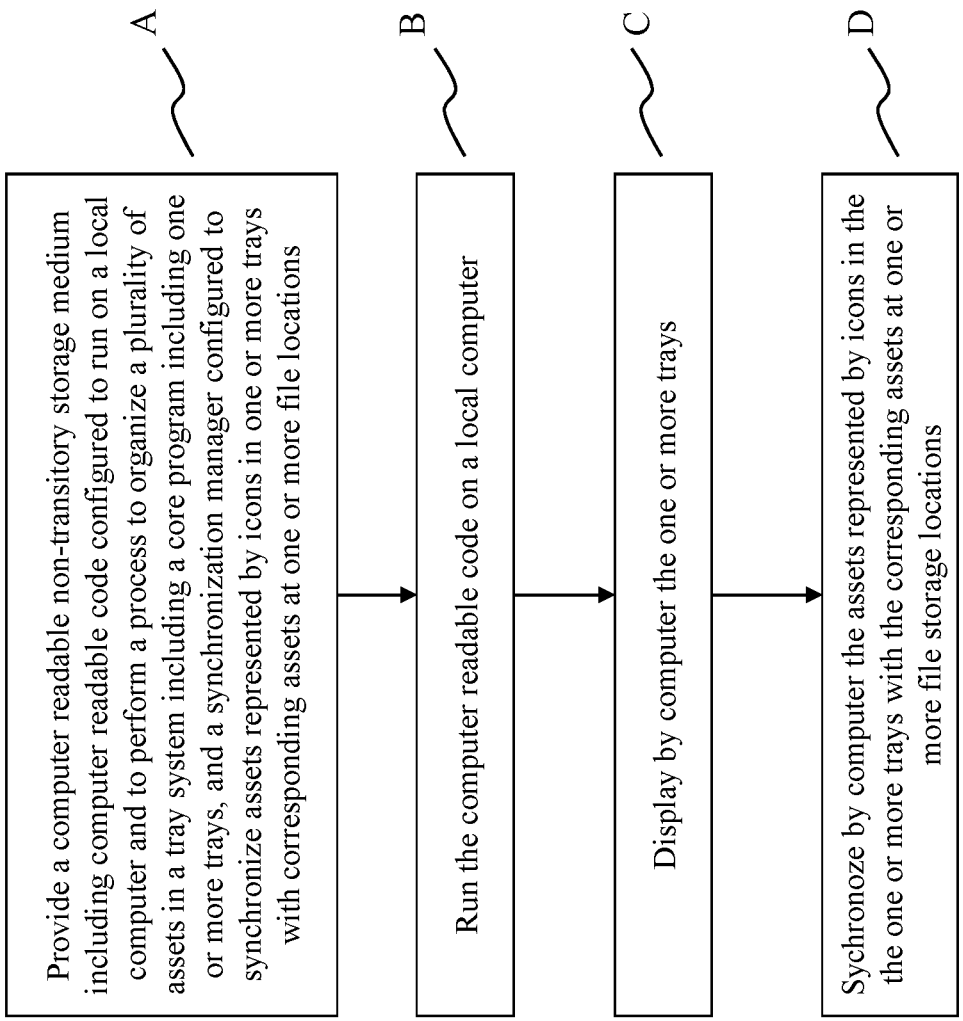
FIG. 4 shows a block diagram of one exemplary process configured to organize a plurality of assets in a tray system.

One embodiment of the tray process as described hereinabove is shown in the block diagram of FIG. 4. The exemplary process includes the steps of: A) Provide a computer readable non-transitory storage medium including a computer readable code configured to run on a local computer and to perform a process to organize a plurality of assets in a tray system including a core tray program including one or more trays, and a synchronization manager configured to synchronize assets represented by icons in the one or more trays with corresponding assets at one or more file storage locations; B) Run the computer readable code on a local computer the computer readable code; C) Display by computer the one or more trays; and D) Synchronize by computer the assets represented by icons in the one or more trays with the corresponding assets at one or more file storage locations.

The computer programs and/or code described herein are typically provided on a computer readable non-transitory storage medium which includes a computer readable code configured to run on a local computer, which can be a client computer.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A system comprising:
   a memory; and
   a processor, coupled to the memory, the processor configured to:
   provide a core tray program to each software application of a plurality of software applications, each core tray program for managing a local tray system and a plurality of local assets stored within a plurality of trays by the local tray system, wherein each subset of the plurality of local assets associated with a tray of the plurality of trays has a common theme;
   provide a synchronization manager for synchronizing the plurality of local assets stored within the local tray system with a plurality of remote assets stored within a remote tray system upon a remote server, and
   provide a tray management program implementing a first graphical user interface allowing a user to manage the plurality of trays and the plurality of local assets;
   wherein each core tray program provides:
   a second graphical user interface within an application window associated with each software application of the plurality of software applications allowing the user to work with the plurality of local assets and the plurality of trays; and
   synchronization of the plurality of local assets and the plurality of trays with the remote tray system hosted upon the remote server, thus causing remote core tray programs currently in execution within remote software applications to update a plurality of remote assets and a plurality of remote trays to reflect changes made by the user within the plurality of local assets and the plurality of trays with an instance of the core tray program being executed within a software application of the plurality of software applications.

2. The system according to claim 1, wherein the system is one of a plurality of computer systems each synchronizing their own local tray system with the remote tray system upon the remote server.

3. The system according to claim 1, wherein each local asset of the plurality of local assets is displayed to the user as representations of the local asset; and the plurality of trays within the local tray system provide an abstraction layer such that a local asset within the plurality of local assets stored within the plurality of trays is associated independent of its original location.

4. The system according to claim 1, wherein each instance of the core tray program allows the user to perform an asset operation upon a digital asset associated with a local asset of the plurality of local assets in dependence upon whether the digital asset is a file, a logical asset remotely stored, or data describing the digital asset.

5. The system according to claim 1, wherein the synchronization manager synchronizes each local asset of the plurality of local assets within the local tray system in dependence upon an asset type.

6. The system according to claim 1, wherein a local asset of the plurality of local assets is at least one of: a file, a reference to a logical asset stored remotely within a remote file storage location accessible via the network, data describing the local asset, a setting of the software application of the plurality of software applications accessing the local tray system, or a configuration of an application accessing the local tray system.

7. The system according to claim 1, wherein of the core tray program provides for:
   rendering to the user via the second graphical user interface the plurality of trays; operations performed within the second graphical user interface are transferred to the software application of the plurality of software applications associated with the second graphical user interface; and
   storing, within the plurality of trays, digital assets modified by the software application of the plurality of software applications.

8. The system according to claim 1, wherein the processor is further configured to:
   provide an abstraction layer providing a common interface within the second graphical user interface within each software application of the plurality of software applications; and
   replace a high resolution bit mapped impression of an image with a lower resolution bit mapped image based upon dynamic user adjustments of a size of a displayed tray of the plurality of trays.

9. The system according to claim 1, wherein the processor is further configured to:
   execute a conflict resolution procedure with the synchronization manager when both the local tray system and remote tray systems have changed since a previous synchronization of the local tray system with the remote tray system upon the remote server; and
   allow the user to search for and acquire assets with each instance of the core tray program.

10. The system according to claim 1, wherein the processor is further configured to:
    reflect user modifications made to at least one of: a local asset of the plurality of local assets or a tray of the plurality of trays within a software application of the plurality of software applications.

11. A non-transitory computer readable storage medium encoding computer executable instructions which, when executed by a computer system, cause the computer system to:
    provide a core tray program to each software application of a plurality of software applications, each core tray program for managing a local tray system and a plurality of local assets stored within a plurality of trays by the local tray system, wherein each subset of the plurality of local assets associated with a tray of the plurality of trays has a common theme;
    provide a synchronization manager for synchronizing the plurality of local assets stored upon the computer system within the local tray system with a plurality of remote assets stored within a remote tray system upon a remote server, and
    provide a tray management program implementing a first graphical user interface allowing a user to manage the plurality of trays and the plurality of local assets;
    wherein each core tray program provides:
    a second graphical user interface within an application window associated with each software application of the plurality of software applications allowing the user to work with the plurality of local assets and the plurality of trays; and
    synchronization of the plurality of local assets and the plurality of trays with the remote tray system hosted upon the remote server, thus causing remote core tray programs currently in execution within the other remote software applications to update a plurality of remote assets and a plurality of remote trays to reflect changes made by the user within the plurality of local assets and the plurality of trays with an instance of the core tray program being executed within a software application of the plurality of software applications.

12. The non-transitory computer readable storage medium according to claim 11, wherein
the computer system is one of a plurality of computer systems each synchronizing their own local tray system with the remote tray system upon the remote server.

13. The non-transitory computer readable storage medium according to claim 11, wherein each local asset of the plurality of local assets is displayed to the user as representations of the
local asset; and
the plurality of trays within the local tray system provide an abstraction layer such that a local asset within the plurality of local assets stored within the plurality of trays is associated independent of its original location.

14. The non-transitory computer readable storage medium according to claim 11, wherein
each instance of the core tray program allows the user to perform an asset operation upon a digital asset associated with a local asset of the plurality of local assets in dependence upon whether the digital asset is a file, a logical asset remotely stored, or data describing the digital asset.

15. The non-transitory computer readable storage medium according to claim 11, wherein
the synchronization manager synchronizes each local asset of the plurality of local assets within the local tray system in dependence upon an asset type.

16. The non-transitory computer readable storage medium according to claim 11, wherein
a local asset of the plurality of local assets is at least one of: a file, a reference to a logical asset stored remotely within a remote file storage location accessible via the network, data describing the local asset, a setting of the software application of the plurality of software applications accessing the local tray system, or a configuration of an application accessing the local tray system.

17. The non-transitory computer readable storage medium according to claim 11, wherein
the core tray program provides for:
rendering to the user via the second graphical user interface the plurality of trays; operations performed within the second graphical user interface are transferred to the software application of the plurality of software applications associated with the second graphical user interface; and
storing, within the plurality of trays, digital assets modified by the software application of the plurality of software applications.

18. The non-transitory computer readable storage medium according to claim 11, further comprising executable instructions which, when executed by the computer system, cause the computer system to:
provide an abstraction layer providing a common interface within the second graphical user interface within each software application of the plurality of software applications; and
replace a high resolution bit mapped impression of an image with a lower resolution bit mapped image based upon dynamic user adjustments of a size of a displayed tray of the plurality of trays.

19. The non-transitory computer readable storage medium according to claim 11, further comprising executable instructions which, when executed by the computer system, cause the computer system to:
execute a conflict resolution procedure with the synchronization manager when both the local tray system and remote tray systems have changed since a previous synchronization of the local tray system with the remote tray system upon the remote server; and
allow the user to search for and acquire assets with each instance of the core tray program.

20. The non-transitory computer readable storage medium according to claim 11, further comprising executable instructions which, when executed by the computer system, cause the computer system to:
reflect user modifications made to at least one of: a local asset of the plurality of local assets or a tray of the plurality of trays within a software application of the plurality of software applications.

* * * * *